(12) United States Patent
Park et al.

(10) Patent No.: US 8,638,882 B2
(45) Date of Patent: Jan. 28, 2014

(54) METHOD AND APPARATUS FOR OFFSET ESTIMATION IN MOBILE COMMUNICATION SYSTEM

(75) Inventors: Hyo-Yol Park, Seoul (KR); Yon-Woo Yoon, Anyang-si (KR); Hwa-Sun You, Seoul (KR); Hee-Won Kang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 163 days.

(21) Appl. No.: 13/369,595

(22) Filed: Feb. 9, 2012

(65) Prior Publication Data

US 2012/0207257 A1   Aug. 16, 2012

(30) Foreign Application Priority Data

Feb. 16, 2011   (KR) .................. 10-2011-0013692

(51) Int. Cl.
*H03K 9/00*   (2006.01)
(52) U.S. Cl.
USPC .......................................... 375/316

(58) Field of Classification Search
USPC ................... 375/316, 260, 229, 243
See application file for complete search history.

(56) References Cited

U.S. PATENT DOCUMENTS

| | | | |
|---|---|---|---|
| 2005/0015818 A1* | 1/2005 | Kim et al. | 725/146 |
| 2006/0104254 A1* | 5/2006 | Shin et al. | 370/343 |
| 2009/0154613 A1* | 6/2009 | Lai | 375/344 |
| 2009/0213943 A1* | 8/2009 | Gu et al. | 375/260 |
| 2011/0244807 A1 | 10/2011 | Yoon et al. | |
| 2012/0121003 A1* | 5/2012 | Kleider et al. | 375/229 |

* cited by examiner

*Primary Examiner* — Jaison Joseph
(74) *Attorney, Agent, or Firm* — Jefferson IP Law, LLP (57) ABSTRACT

A method and an apparatus for estimating an offset are provided. The method includes determining one of a frequency offset and a timing offset to be estimated first for pilot symbols detected from a received signal, estimating one of the frequency offset and the timing offset for the pilot symbols according to the determination, compensating for an offset of the pilot symbols based on the estimated offset, and estimating remaining one of the frequency offset and the timing offset which is not estimated for the offset compensated pilot symbols.

21 Claims, 6 Drawing Sheets

METHOD AND APPARATUS FOR OFFSET ESTIMATION IN MOBILE COMMUNICATION SYSTEM

PRIORITY

This application claims the benefit under 35 U.S.C. §119(a) of a Korean patent application filed in the Korean Intellectual Property Office on Feb. 16, 2011 and assigned Serial No. 10-2011-0013692, the entire disclosure of which is hereby incorporated by reference.

BACKGROUND OF THE INVENTION

1. Field of the Invention

The present invention relates to a method and an apparatus for estimating offset. More particularly, the present invention relates to a method for estimating frequency offset and timing offset implemented for channel estimation in a mobile communication system, and an apparatus thereof.

2. Description of the Related Art

A receiver device of a mobile communication system, such as the Institute of Electrical and Electronics Engineers (IEEE) 802.16 communication system, performs channel estimation in a procedure of restoring an original signal using a received signal. When the communication system employs an Orthogonal Frequency Division Multiplexing (OFDM) scheme as a standard protocol, a receiver device typically needs information such as frequency offset or timing offset to improve channel estimation performance. The receiver device may compensate for the frequency offset or the timing offset using information regarding acquired frequency offset and timing offset in a channel estimation procedure to improve channel estimation performance.

When estimating frequency offset, the receiver device performs Fast Fourier Transform (FFT) for a received signal to acquire frequency symbols, extracts pilot symbols from the acquired frequency symbols, and estimates frequency offset using a pair of pilot symbols of the extracted pilot symbols existing on the same frequency axis. The receiver device calculates a phase difference between two pilot symbols and divides the calculated phase difference by a symbol interval (namely, time interval) between two pilot symbols to estimate phase variation on a time axis for a unit symbol.

When estimating timing offset, the receiver device performs FFT for a received signal to acquire frequency symbols, extracts pilot symbols from the acquired frequency symbols, and estimates timing offset using a pair of pilots of the extracted pilot symbols existing on the same time axis. The receiver device calculates a phase difference between two pilot symbols, and divides the calculated phase difference by a frequency interval between two pilot symbols to estimate phase variation on frequency axis for each frequency.

As described above, estimation of frequency offset and estimation of timing offset are performed separately. Because pilot symbols have a lattice type pattern (referred to as 'pilot pattern' hereinafter) where pilot symbols are arranged to overlap each other on the same frequency axis and the same time axis (or symbol axis) in a unit resource region in an IEEE 802.16e protocol, exact offset estimation is possible due to a small quantity of errors in the offset estimation although the timing offset and the frequency offset are separately performed. In a case of a pilot pattern in the lattice form where pilots overlap each other at the same frequency and the same time as in a pilot pattern of an IEEE 802.16e communication system, the separate estimations of frequency offset and timing offset do not cause problems.

However, in a case of a pilot pattern where pilot symbols do not overlap each other at the same frequency axis and the same time axis in a Logical Resource Unit (LRU) structure as in a pilot pattern of an IEEE 802.16m system, a method for separately estimating and using frequency offset and timing offset has an ambiguity problem in estimation. When phase estimation is performed using a pair of pilot symbols distant from each other on both the time axis and the frequency axis (i.e., pilot symbols which are not located on the same frequency axis and the same time axis), because timing offset and frequency offset are estimated to overlap each other, offset estimation cannot be performed exactly. If offset estimation is not performed exactly, Mean Square Error (MSE) performance of channel estimation is degraded, and accordingly link performance is degraded in a high Signal to Noise Ratio (SNR) region.

SUMMARY OF THE INVENTION

Aspects of the present invention are to address at least the above-mentioned problems and/or disadvantages and to provide at least the advantages described below. Accordingly, an aspect of the present invention is to provide the above-mentioned problems occurring in the prior art, and to provide a method for estimating offset solving an ambiguity problem in separate frequency offset and timing estimation methods, and an apparatus thereof.

Another aspect of the present invention is to provide a method for estimating frequency and timing offsets, which can overcome the degradations of channel estimation and link performance that may occur in a pilot arrangement structure of an IEEE 802.16m communication system.

In accordance with an aspect of the present invention, a method for estimating an offset by a receiver device in a mobile communication system is provided. The method includes determining one of a frequency offset and a timing offset to be estimated first for pilot symbols detected from a received signal, estimating one of the frequency offset and the timing offset for the pilot symbols according to the determination, compensating for an offset of the pilot symbols based on the estimated offset, and estimating remaining one of the frequency offset and the timing offset which is not estimated for the offset compensated pilot symbols.

In accordance with another aspect of the present invention, a receiver device in a mobile communication system is provided. The device includes an estimation order determinator for determining one of a frequency offset and a timing offset to be estimated first for pilot symbols detected from a received signal, a first offset estimator for estimating one of the frequency offset and the timing offset for the pilot symbols according to the determination, an offset compensator for compensating for an offset of the pilot symbols based on the estimated offset, and a second offset compensator for estimating remaining one of the frequency offset and the timing offset which is not estimated for the offset compensated pilot symbols.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, description of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, offset estimation of a receiver device is described. The receiver device may further include additional structural elements (e.g., structural elements for reception, channel estimation, channel equalization) in addition to the structural elements for offset estimation described herein. However, because these additional structural elements are related to functions not directly relevant to offset estimation, description of these structural elements are omitted for the sake of clarity and conciseness.

An exemplary embodiment of the present invention uses a method for sequentially estimating timing offset and frequency offset without separately estimating these offsets, and includes an offset compensator and an offset estimator, to address ambiguity on offset estimation.

According to an exemplary embodiment of the present invention, when pilot symbols extracted by performing Fast Fourier Transform (FFT) for a received signal are not located on the same time axis and the frequency axis, an offset for pairs of pilot symbols located nearer to each other on the time axis and the frequency axis is estimated first. An offset for pairs of pilot symbols, which are relatively less distanced from each other on the time axis or the frequency axis, are estimated first. Thereafter, phase compensation is performed for pilot symbols based the offset information estimated first among the timing offset and the frequency offset and then based on the remaining offset information.

Hereinafter, it is assumed that a receiver device according to an exemplary embodiment of the present invention is a base station receiver device existing in a communication system. However, the receiver device may also be included in a user terminal and a receiver device of a repeater without deviating from the scope of the present invention.

Figure 1:
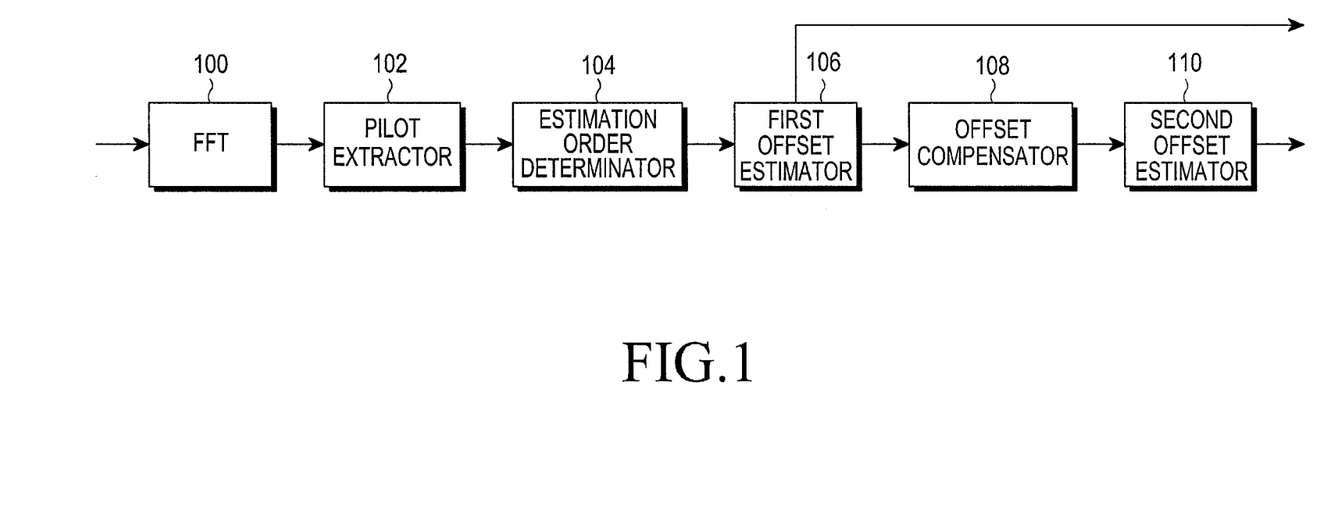
FIG. 1 is a block diagram illustrating a configuration of an apparatus for estimating an offset according to an exemplary embodiment of the present invention.

FIG. 1 is a block diagram illustrating a configuration of an apparatus for estimating an offset according to an exemplary embodiment of the present invention.

Referring to FIG. 1, the apparatus includes an FFT unit 100, a pilot extractor 102, an estimation order determinator 104, a first offset estimator 106, an offset compensator 108, and a second offset estimator 110. The FFT unit 100 receives and converts a received signal into a frequency signal to output frequency symbols. The pilot extractor 102 selects a pilot symbol from the frequency symbols. The estimation order determinator 104 determines one of frequency offset and timing offset to be estimated first. The first offset estimator 106 estimates the offset selected by the estimation order determinator 104 to be estimated first using the extracted pair of pilot symbols. The offset compensator 108 performs offset compensation for the pilot symbol with the estimated offset to perform phase compensation. The second offset estimator 110 estimates the offset which is not estimated second using a pilot symbol where the other offset has been compensated.

The FFT unit 100 converts the received signal into a frequency signal to acquire frequency symbols and outputs the acquired frequency symbols to the pilot extractor 102.

The pilot extractor 102 selects pilot symbols to be used for offset estimation and stores the selected pilot symbols in a memory buffer (not shown). The memory buffer may be provided as a separate structural element of the apparatus, or may be included inside the pilot extracting unit 102. The pilot extractor 102 extracts a pilot from all symbols of channel estimation unit, and stores a location and a symbol location (namely, a location on time axis) on a frequency axis of a pilot in the memory buffer for the estimation order determinator 104.

The estimation order determinator 104 determines whether to estimate frequency offset first or timing offset first. The estimation order determinator 104 observes a pattern of a pilot. When there is a pair of pilot symbols of the same time location, the estimation order determinator 104 estimates timing offset first. When there is a pair of pilot symbols of the same frequency location, the estimation order determinator 104 may determine that frequency offset is estimated first.

When there is no pair of pilot symbols of the same location at a time or frequency axis, the estimation order determinator 104 determines offset corresponding to an axis in which the distance between two pilot symbols of the pilot symbol pair is the shortest. When a minimum time distance is less than a minimum frequency distance of two pilot symbols, the estimation order determination unit 104 first estimates timing offset. When the minimum time distance is equal to or greater than the minimum frequency distance of two pilot symbols, the estimation order determinator 104 determines frequency offset.

FIG. 2 to FIG. 4C are views illustrating uplink pilot patterns according to the number of data streams transmitted in an IEEE 802.16m communication system according to an exemplary embodiment of the present invention. In a communication system such as IEEE 802.16m, a plurality of data streams may be transmitted into one resource region, and the data streams are multiplexed by different pilot patterns. Accordingly, there is a pilot pattern for each pilot symbol in proportion to the number of streams.

FIGS. 2 to 4C illustrate Contiguous Resource Unit (CRU) as an example of an unit resource region. Other examples of a unit resource region include a Logical Resource Unit (LRU), a Physical Resource Unit (PRU), and the like. The LRU is a resource region expressed by a two-dimensional structure of a frequency and a symbol. The LRU may be a resource allotment unit of a pilot pattern, and may be configured by Distributed Resource Unit (DRU) or CRU.

Figure 2:
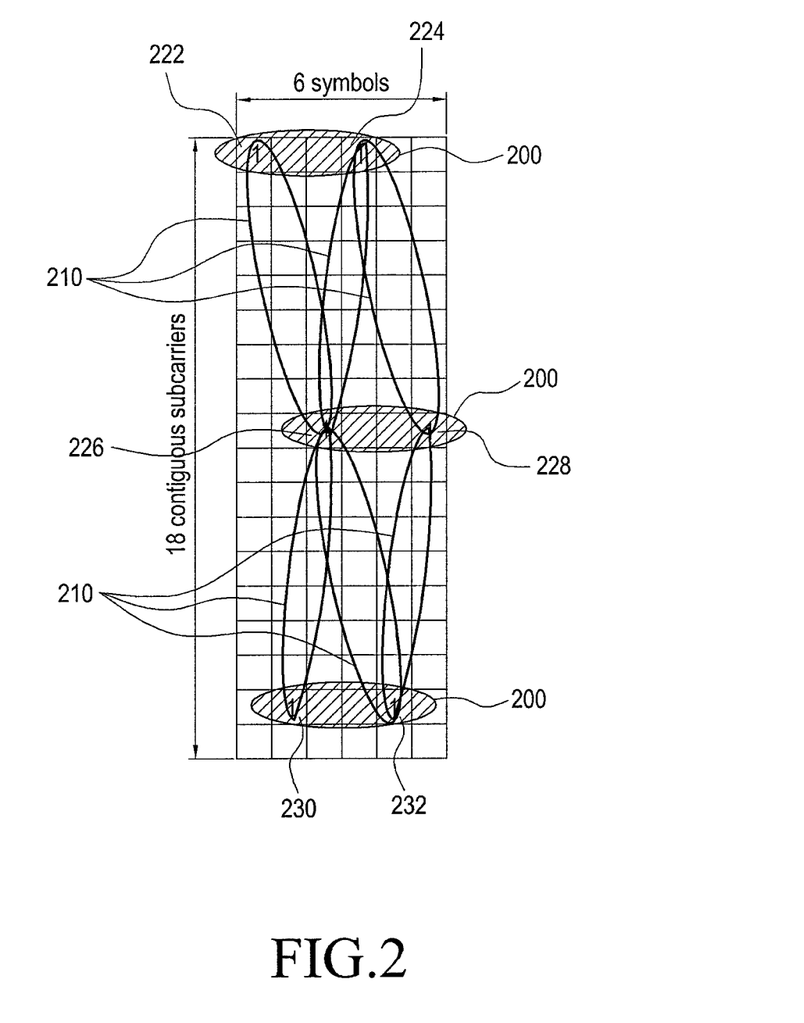
FIG. 2 is a view illustrating a pilot pattern of a Contiguous Resource Unit (CRU) region in a case where there is one stream in an Institute of Electrical and Electronics Engineers (IEEE) 802.16m communication system according to an exemplary embodiment of the present invention.
Figure 3A:
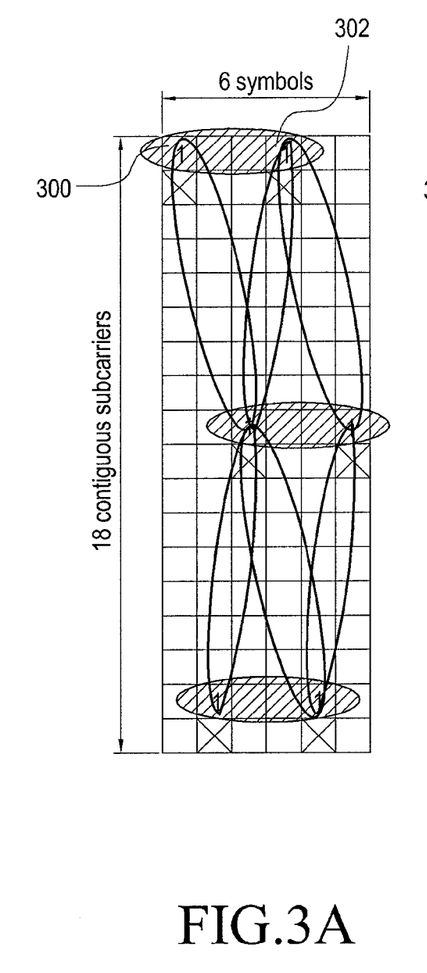
FIGS. 3A and 3B are views illustrating a pilot pattern of a CRU region in a case where there are two streams in an IEEE 802.16m communication system according to an exemplary embodiment of the present invention.
Figure 3B:
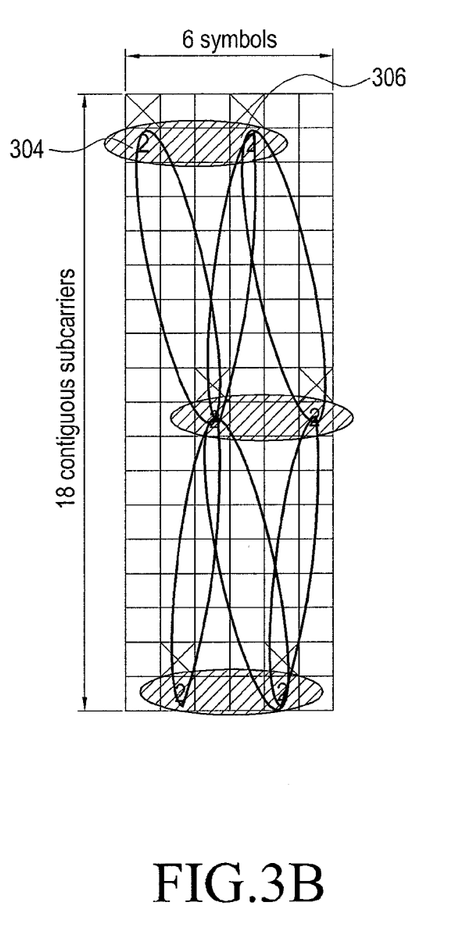
Figure 4A:
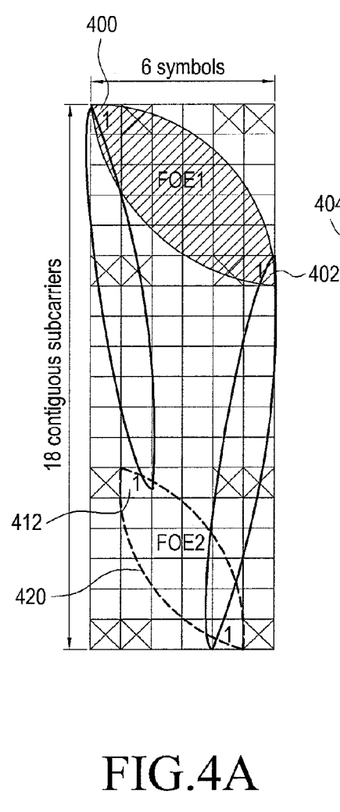
FIGS. 4A-4C are views illustrating a pilot pattern of a CRU region in a case where there are three streams in an IEEE 802.16m communication system according to an exemplary embodiment of the present invention.
Figures 4B, 4C:
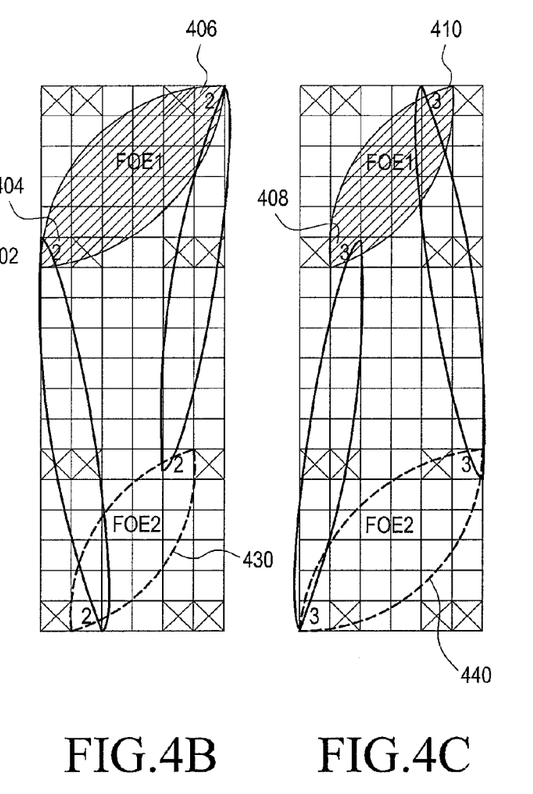

FIG. 2 illustrates a pilot pattern of the CRU for resource allotment in a case where there is one stream. FIGS. 3A and 3B illustrate a pilot pattern of a CRU region in a case where there are two streams. FIGS. 4A-4C illustrate a pilot pattern of a CRU region in a case where there are three streams. Referring to FIGS. 2 to 4C, a horizontal axis is a symbol axis (namely, time axis), and a vertical axis is a frequency axis.

Referring to FIG. 2, ellipses 200 express pilot pairs for estimating a frequency offset. Ellipses 210 express pilot pairs for estimating timing offset.

When there is one stream, pilot pairs (222,224), (226,228), and (230,232) are located on the same frequency axis, no pilot pairs are located on the same symbol axis, and there is a distance corresponding to 1 unit symbol between a pilot pair for estimating timing offset (e.g., distance between symbols 224 and 226) or a distance corresponding to 2 unit symbol between a pilot pair for estimating timing offset (e.g., distance between symbols 222 and 224). Accordingly, the estimation order determinator 104 may determine that frequency offset is estimated first using pilot pairs (222,224), (226,228), and (230,232) existing on the same frequency axis.

FIGS. 3A and 3B illustrate a pilot pattern of a CRU region when there are two streams.

Referring to FIGS. 3A and 3B, pilot symbols used for offset estimation have two types (two streams), namely, pilots (e.g., 300 and 302) expressed by 1 and pilots (304 and 306) expressed by 2. A symbol expressed by an "X" in a lattice structure of the CRU region indicates that the symbol X is occupied by a pilot of another steam. For example, an "X" expressed under a symbol 300 in FIG. 3A indicates that corresponding symbol locations are occupied by a symbol 304 in FIG. 3B.

Referring to FIGS. 3A and 3B having two streams, pilot pairs (300, 302) and (304, 306) are located on the same frequency axis as in a case of FIG. 2. Accordingly, the estimation order determinator 104 may determine that frequency offset is estimated first using pilot pairs (300, 302) and (304, 306) existing on the same frequency axis.

FIGS. 4A-4C illustrate a pilot pattern of a CRU region where there are three streams.

Referring to FIGS. 4A-4C, pilot symbols used for offset estimation include three types of pilots (three streams), which include pilots (400 and 402) expressed by 1, pilots (404 and 406) expressed by 2, and pilots (408 and 410) expressed by 3. In the lattice structure of the CRU region, a symbol expressed by the "X" is illustrated in FIGS. 3A and 3B. In addition, ellipses 420, 430, and 440 are expressed by a dotted line in FIGS. 4A-4C. The ellipses 420, 430, and 440 expressed by a dotted line express a pilot pair which may be further used for Frequency Offset Estimation (FOE) in addition to the pilot pair (400,402) where there are three streams.

In a case with three streams, unlike the cases shown in FIGS. 2 to 3B having one or two streams, no pilot pairs exist on the same frequency axis or the same time axis (namely, symbol axis). Accordingly, the estimation order determinator 104 determines that offset estimation with respect to an axis having the shortest distance between two pilot symbols included in the pilot pair is performed first. Because a distance on a time axis between symbols 400 and 412 is 1 unit symbol, which is less than that on a frequency axis between symbols 400 and 402 (which is 5 unit frequency), the estimation order determinator 104 may determine such that timing offset is estimated first.

Accordingly, in the communication system using pilot patterns shown in FIGS. 2 to 4C, the estimation order determinator 104 first estimates frequency offset where the total number of streams is equal to or less than 2 according to the number of streams. Further, the estimation order determinator 104 may estimate timing offset first where the total number of streams is equal to or greater than 3.

The first offset estimator 106 estimates frequency offset or timing offset from a phase difference of respective pairs of pilot symbols according to a determination result of the estimation order determinator 104. The first offset estimator 106 uses pilot symbols of a stream corresponding to a terminal in all Logical Resource Units (LRUs) allotted to the terminal for each reception antenna included in the receiver device to estimate frequency offset or timing offset.

Assuming that a Least Square (LS) estimation value of a 2i-th pilot tone received in a reception antenna r of an n-th LRU to which a terminal u is allotted is $\hat{H}_{LS}^{n,r}[l_{2i}^P, k_{2i}^P]$, the correlation of a pilot signal of the same subcarrier may be defined by Equation (1) below.

$$Z_{pilot}^{r,u} = \sum_{n=1}^{uth\ user's\ LRU} \sum_{i=1}^{N_p/2} \hat{H}_{LS}^{n,r}[l_{2i}^P, k_{2i}^P](\hat{H}_{LS}^{n,r}[l_{2i-1}^P, k_{2i-1}^P])^* \quad (1)$$

In Equation (1), uth user's LRU(=N) denotes the number of LRUs to which a terminal u is allotted, $N_p$ denotes the number of pilot symbol pairs, Np/2 denotes the number of pilot symbol pairs. $l^P$ denotes a symbol index of a pilot p symbol, and $k^P$ denotes a frequency index of a pilot p symbol. Accordingly, $\hat{H}_{LS}^{n,r}[l_{2i}^P, k_{2i}^P](\hat{H}_{LS}^{n,r}[l_{2i-1}^P, k_{2i-1}^P])^*$ denotes a calculation using a correlation estimation value with respect to a pilot symbol pair including a pilot symbol expressed by 2i and a pilot symbol expressed by (2i-1).

Inverse tangent calculation for the correlation $Z_{pilot}^{r,u}$ obtained from the equation 1 is performed to obtain a phase (referred to as 'angle' hereinafter). The phase is divided by a symbol interval $\Delta l$ and a frequency interval $\Delta k$ to calculate frequency offset $\theta_{freq}^{r,u}$ or timing offset $\theta_{ti\ min\ g}^{r,u}$ as expressed by Equation (2) below.

$$\theta_{freq}^{r,u} = \frac{\text{angle}(Z_{pilot}^{r,u})}{\Delta l} \quad (2)$$

$$\theta_{timing}^{r,u} = \frac{\text{angle}(Z_{pilot}^{r,u})}{\Delta k}$$

The first offset estimator 106 outputs the estimated offset information to a channel estimator (not shown) so that the receiver device may use the estimated channel offset information in a channel estimation procedure.

The offset compensator 108 receives information with respect to the timing offset or the frequency offset from the first offset estimator 106. The offset compensator 108 compensates for pilot symbols of all reception antennae using information regarding the received offset.

Assuming that $H_{LS}^{n,r}[l_i^p, k_i^p]$ is a channel value with respect to a received signal in an i-th pilot tone of an r-th antenna of an LRU to which a terminal u is allotted, a channel estimation value compensating for frequency offset (FO) $\hat{H}_{FO}^{u,r}[l_i^p, k_i^p]$ and a channel estimation value $\hat{H}_{TO}^{u,r}[l_i^p, k_i^p]$ compensating for timing offset (TO) are defined by Equation (3).

$$\hat{H}_{FO}^{u,r}[l_i^p, k_i^p] = \hat{H}_{LS}^{u,r}[l_i^p, k_i^p] e^{-jl^p \theta_{freq}^{r,u}}$$

$$\hat{H}_{TO}^{u,r}[l_i^p, k_i^p] = \hat{H}_{LS}^{u,r}[l_i^p, k_i^p] e^{-jk^p \theta_{timing}^{r,u}} \quad (3)$$

$\hat{H}$ denotes an estimation value of H obtained by estimation.

The second offset estimator 110 estimates a remaining offset not estimated by the first offset estimator 106 using a signal estimation value for which offset is compensated. When the first offset estimator 106 estimates timing offset, the second offset estimator 110 estimates the frequency offset. When the first offset estimator 106 estimates the frequency offset the timing offset, the second offset estimator 110 estimates the timing offset.

In the same manner as in the first offset estimator 106, the second offset estimator 110 uses pairs of pilot symbols of a stream corresponding to the terminal in all LRUs allotted to the terminal for each reception antenna.

Correlation of a pilot signal with respect to frequency offset compensated pilot symbols and timing offset compensated pilot symbols in a reception antenna r of an n-th LRU of the terminal u may be expressed by Equation (4).

$$Z_{pilot,time}^{r,u} = \sum_{n=1}^{uth\ user's\ LRU} \sum_{i=1}^{N_p/2} \hat{H}_{FO}^{n,r}[l_{2i}^p, k_{2i}^p](\hat{H}_{FO}^{n,r}[l_{2i-1}^p, k_{2i-1}^p])^* \quad (4)$$

$$Z_{pilot,freq}^{r,u} = \sum_{n=1}^{uth\ user's\ LRU} \sum_{i=1}^{N_p/2} \hat{H}_{TO}^{n,r}[l_{2i}^p, k_{2i}^p](\hat{H}_{TO}^{n,r}[l_{2i-1}^p, k_{2i-1}^p])^*$$

In Equation (4), $\hat{H}_{FO}^{n,r}[l_{2i}^p, k_{2i}^p](\hat{H}_{FO}^{n,r}[l_{2i-1}^p, k_{2i-1}^p])^*$ denotes calculation using an estimation value with respect to a pilot symbol pair including a frequency offset compensated pilot symbol expressed by 2i and a frequency offset compensated pilot symbol expressed by (2i−1), and $\hat{H}_{TO}^{n,r}[l_{2i}^p, k_{2i}^p](\hat{H}_{TO}^{n,r}[l_{2i-1}^p, k_{2i-1}^p])^*$ denotes calculation using an estimation value with respect to a pilot symbol pair including a timing offset compensated pilot symbol expressed by 2i and a timing offset compensated pilot symbol by (2i−1).

Inverse tangent calculations for timing correlation $Z_{pilot,time}^{r,u}$ and frequency correlation $Z_{pilot,freq}^{r,u}$ acquired by Equation 4 are performed to obtain a phase, the obtained phase is divided by a symbol interval Δl or a frequency interval Δk of each pilot to calculate frequency offset $\theta_{freq}^{r,u}$ or timing offset $\theta_{ti\ min\ g}^{r,u}$ as shown in Equation (5) below.

$$\theta_{freq.}^{r,u} = \frac{angle(Z_{pilot,freq.}^{r,u})}{\Delta l} \quad (5)$$

$$\theta_{timing}^{r,u} = \frac{angle(Z_{pilot,time}^{r,u})}{\Delta k}$$

The second offset estimator 110 outputs the estimated offset information to a channel estimator (not shown) such that the receiver device may use the estimated offset information in a channel estimation procedure.

As illustrated above, the offset estimator according to an exemplary embodiment of the present invention does not separately obtain frequency offset and timing offset, and reflects a result of first estimating one of the timing offset and the frequency offset and then estimating the remaining offset through an offset compensation procedure. Exact estimation of offset is also possible in a system with a pilot pattern in which a pair of pilot symbols are not arranged on one frequency axis or time axis as in an IEEE 802.16m communication system.

Figure 5:
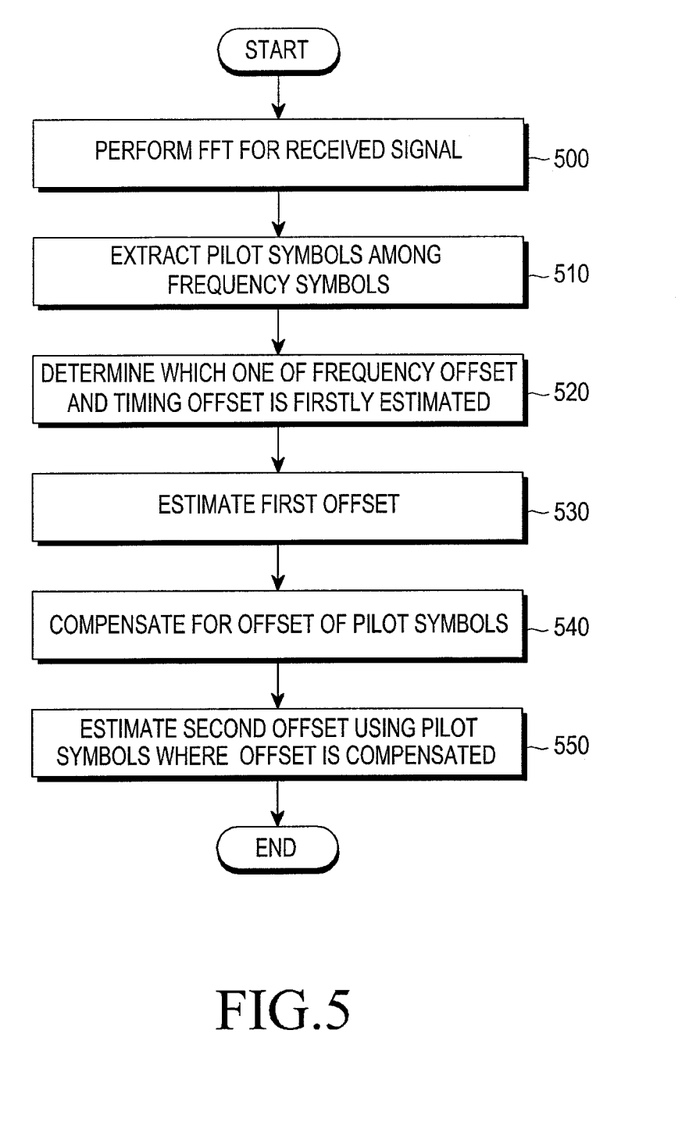
FIG. 5 is a flowchart illustrating a method for estimating offset according to an exemplary embodiment of the present invention.

FIG. 5 is a flowchart illustrating an operation of an apparatus for estimating offset according to an exemplary embodiment of the present invention.

Referring to FIG. 5, the apparatus performs FFT for a received signal to acquire frequency symbols in step 500. The apparatus selects or extracts pilot symbols among the acquired frequency symbols in step 510.

The apparatus determines which one of the frequency offset and the timing offset is to be estimated first using the extracted pilot symbols and location information of the frequency axis and time axis of the pilot symbols in step 520.

The apparatus may determine to estimate first an offset corresponding to the shortest distance axis between two pilot symbols of respective pairs of pilot symbols which may be configured by the extracted pilot symbols. The distance between each pair of pilot symbols may be previously known by a pilot pattern. Instead of identifying the distance between each pilot symbol pair on the frequency axis or the time axis, information on whether to estimate the frequency offset first or the timing offset first may be stored in advance according to a corresponding pilot pattern. For example, when pilot patterns as shown in FIGS. 2 to 4C are used, the estimation order determinator 104 may determine to estimate frequency offset first when the total number of streams is 2 or less and estimate timing offset first when the total number of streams is equal to or than 3.

The apparatus estimates a first offset (one of frequency offset and timing offset) in which estimation is determined to be performed first according to the determination of step 520 in step 530. The apparatus may transfer information about the first estimated offset (referred to as 'first offset information' hereinafter) to the channel estimator (not shown) such that the channel estimator may use a channel estimation procedure. The apparatus for estimating offset compensates for offset of pilot symbols by using the first offset information in step 540.

The apparatus estimates the remaining offset (referred to as 'second offset' hereinafter) which is not estimated using pilot symbols where the offset is compensated in step 550. The apparatus transfers information about the second estimated offset to the channel estimator (not shown) such that the channel estimator may use a channel estimation procedure. A channel estimator separately included in the receiver apparatus estimates a channel using the first offset information and the second offset information.

Figure 6:
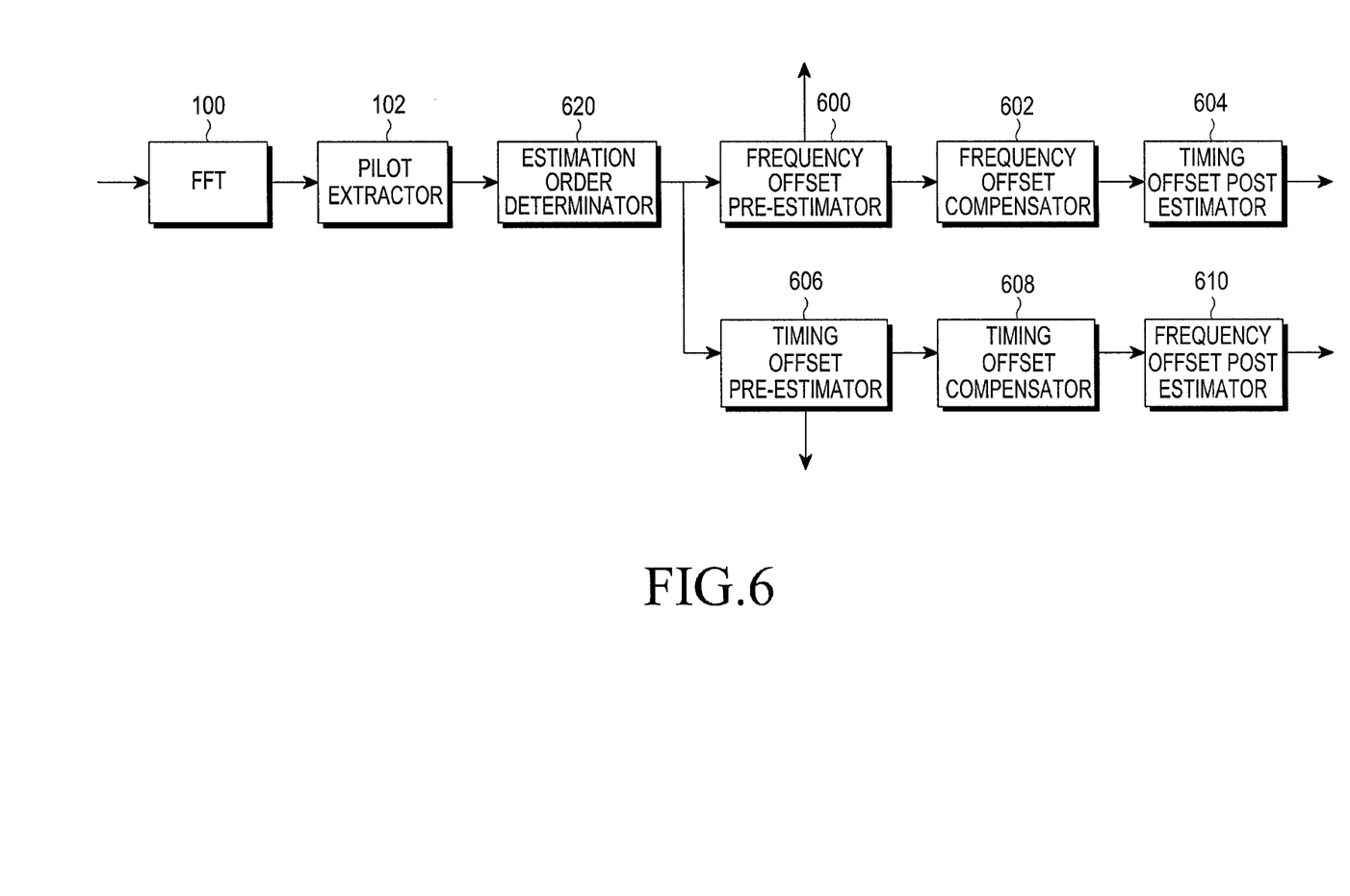
FIG. 6 is a block diagram illustrating a configuration of a receiver device according to another exemplary embodiment of the present invention.

FIG. 6 is a block diagram illustrating a configuration of a receiver device according to an exemplary embodiment of the present invention. Because functions of the FFT unit 100 and the pilot extractor 102 are similar to those shown in FIG. 1, a repeated description thereof is omitted.

An estimation order determinator 620 controls a frequency offset pre-estimator 600 to estimate frequency offset when it has been determined that the frequency offset should be estimated first. When it has been determined that the timing offset should be estimated first, the estimation order determinator 620 controls a timing offset pre-estimator 606 to estimate timing offset.

The estimation order determinator 620 determines which of the frequency offset and timing offset is estimated first using pilot symbols extracted by the pilot extractor 102 and location information of a frequency axis and a time axis of the pilot symbols. The estimation order determinator 620 may determines that an offset corresponding to an axis having the shortest distance between two pilot symbols of each pair of pilot symbols is estimated first. For example, when pilot patterns as shown in FIGS. 2 to 4C are used, the estimation order determinator 620 may determine that frequency offset is estimated first when the total number of streams is 2 or less. When the total number of streams is equal to or greater than 3, the estimation order determinator 620 may determine that a timing offset is estimated first.

When the estimation order determinator 620 determines that frequency offset is estimated first, a frequency offset pre-estimator 600 may estimate frequency offset and transfer the estimation result to a channel estimator (not shown) such that the channel estimator may use the estimation result in a channel estimation procedure. The frequency offset pre-estimator 600 transfers the estimation result to a frequency offset compensator 602.

The frequency offset compensator 602 performs offset compensation with respect to pilot symbols using frequency offset input from the frequency offset pre-estimator 600 and transfers offset compensated pilot symbols to a timing offset post-estimator 604. A timing offset post-estimator 604 estimates timing offset and transfers the estimated result to a channel estimator (not shown).

When the estimation order determinator 620 determines that timing offset is estimated first, the timing offset pre-estimator 606 estimates timing offset and transfers the estimated result to a channel estimator (not shown) such that the channel estimator may use the estimated result in a channel estimation procedure. Further, the timing offset pre-estimator 606 transfers the estimated result to a timing offset compensator 608.

The timing offset compensator 608 performs offset compensation for pilot symbols and transfers the offset compensated pilot symbols to a frequency offset post estimator 610 using timing offset input from the timing offset pre-estimator 606. The frequency offset post-estimator 604 estimates frequency offset using the offset compensated pilot symbol and transfers the estimated offset to the channel estimator (not shown).

The function configuration and the operation flowcharts illustrated in FIGS. 1 to 6 do not limit the scope of the present invention. The estimating apparatus as shown in FIGS. 1 and 6 is merely exemplary. Some elements may be omitted or implemented in a different manner. For example, the FFT unit 100 and the pilot extractor 102 may omitted. When a corresponding operation is implemented by other structural units of the receiver device performing the same operation, the FFT unit 100 and the pilot extractor 102 may not be included.

The operations illustrated in FIG. 5 describe a method operating in a controller of each device by way of example, but do not restrict implementation to include all procedures, or be separately performed by specific calculations or algorithms. Some of the steps 500 and 510 may be omitted in a method for estimating offset according to an exemplary embodiment of the present invention.

The foregoing operations may be implemented by including a memory device storing corresponding program codes in an optional structural element in the receiver device or the apparatus for estimating offset. Each structural element of the receiver device or the apparatus for estimating offset may read and perform the program codes stored in a memory device by a processor or a Central Processing Unit (CPU) to implement the foregoing operations or functions.

According to an exemplary embodiment of the present invention, timing offset and frequency offset for pilot symbols may be sequentially estimated without ambiguity of estimation for a pilot pattern which does not exist at the same location in one of a time axis and a frequency axis. Further, timing offset and frequency offset may be estimated with minimum performance degradation with respect to a pilot pattern in which pilot symbols do not exist at the same location in any one of the time axis and the frequency axis.

Accordingly, when using a method and an apparatus according to an exemplary embodiment of the present invention, offset may be exactly estimated in a communication system such as IEEE 802.16m in which pilot symbols do not exist at the same location in at least one of a time axis and a frequency axis, and accordingly excellent link performance may be obtained.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for estimating an offset by a receiver device in a mobile communication system, the method comprising:
determining one of a frequency offset and a timing offset to be estimated first for pilot symbols detected from a received signal;
estimating one of the frequency offset and the timing offset for the pilot symbols according to the determination;
compensating for an offset of the pilot symbols based on the estimated offset; and
estimating remaining one of the frequency offset and the timing offset which is not estimated for the offset compensated pilot symbols.

2. The method of claim 1, wherein the determining of the one of frequency offset and timing offset to be estimated first comprises determining the one of the frequency offset and the timing offset to be estimated first according to whether a distance between the pilot symbols is less than or equal to a preset value on a frequency axis or a time axis of a unit resource region.

3. The method of claim 1, wherein the determining of the one of frequency offset and timing offset to be estimated first comprises determining the one of the frequency offset and the timing offset to be estimated first based on an arrangement pattern of the pilot symbols in a unit resource region.

4. The method of claim 1, wherein the determining of the one of frequency offset and timing offset to be estimated first comprises:

comparing a distance between the pilot symbols on a frequency axis of a unit resource region with a distance between the pilot symbols on a time axis of the unit resource region;

determining one of the frequency offset and the timing offset to be estimated first based on the comparison result.

5. The method of claim 1, wherein the determining of the one of frequency offset and timing offset to be estimated first comprises:

determining that the frequency offset is estimated first when a number of streams is less than or equal to two; and determining that the timing offset is estimated first when a number of streams is equal to or greater than three.

6. The method of claim 1, wherein the estimating of the one of the frequency offset and the timing offset comprises estimating one of the frequency offset and the timing offset based on a phase difference between respective pilot symbol pairs included in the pilot symbols.

7. The method of claim 1, further comprising estimating a channel based on the estimated offset and the remaining offset.

8. The method of claim 1, wherein the estimating of the one of the frequency offset and the timing offset comprises:

calculating correlations for the pilot symbols;

detecting a phase based on the calculated correlations; and dividing the detected phase by a symbol interval or a frequency interval to estimate the one of the frequency offset and the timing offset based on the estimated offset.

9. The method of claim 1, wherein the compensating for the offset for the pilot symbols comprises compensating for the offset for the pilot symbols based on channel values with respect to the pilot symbols together with the estimated offset.

10. The method of claim 1, wherein the compensating for the offset for the pilot symbols comprises compensating for offset for the pilot symbols according to $$\hat{H}_{FO}^{u,r}[l_i^p,k_i^p]=\hat{H}_{LS}^{u,r}[l_i^p,k_i^p]e^{-jl_i^p\theta_{freq}^{r,u}} \text{ and}$$

$$\hat{H}_{TO}^{u,r}[l_i^p,k_i^p]=\hat{H}_{LS}^{u,r}[l_i^p,k_i^p]e^{-jk_i^p\theta_{timing}^{r,u}},$$

wherein $\hat{H}_{LS}^{n,r}[l_i^p,k_i^p]$ denotes a channel value with respect to a received signal in an i-th pilot tone of an r-th antenna of an LRU to which a terminal u is allotted, $\hat{H}$ denotes an estimation value of H obtained by estimation, $l^p$ denotes a symbol index of a pilot symbol p, $k^p$ denotes a frequency index of the pilot symbol p, $\theta_{freq}^{r,u}$ denotes the frequency offset, $\theta_{ti\,min\,g}^{r,u}$ denotes the timing offset, $\hat{H}_{FO}^{u,r}[l_i^p,k_i^p]$ denotes a channel estimation value compensating for the frequency offset, and $\hat{H}_{TO}^{u,r}[l_i^p,k_i^p]$ denotes a channel estimation value compensating for the timing offset.

11. A receiver device in a mobile communication system, the receiver device comprising:

an estimation order determinator for determining one of a frequency offset and a timing offset to be estimated first for pilot symbols detected from a received signal;

a first offset estimator for estimating one of the frequency offset and the timing offset for the pilot symbols according to the determination;

an offset compensator for compensating for an offset of the pilot symbols based on the estimated offset; and a second offset compensator for estimating remaining one of the frequency offset and the timing offset which is not estimated for the offset compensated pilot symbols.

12. The receiver device of claim 11, wherein the estimation order determinator determines the one of the frequency offset and the timing offset to be estimated first according to whether a distance between the pilot symbols is less than or equal to a preset value on a frequency axis or a time axis of a unit resource region.

13. The receiver device of claim 11, wherein the estimation order determinator determines the one of the frequency offset and the timing offset to be estimated first based on an arrangement pattern of the pilot symbols in a unit resource region.

14. The receiver device of claim 11, wherein the estimation order determinator compares a distance between the pilot symbols on a frequency axis of a unit resource region with a distance between the pilot symbols on a time axis of the unit resource region, and determines the one of the frequency offset and the timing offset to be estimated first based on the comparison result.

15. The receiver device of claim 11, wherein the estimation order determinator determines that the frequency offset is estimated first when a number of streams is less than or equal to two, and determines that the timing offset is estimated first when a number of streams is equal to or greater than three.

16. The receiver device of claim 11, wherein the first offset estimator estimates one of the frequency offset and the timing offset based on a phase difference between respective pilot symbol pairs included in the pilot symbols.

17. The receiver device of claim 11, further comprising a channel estimator for estimating a channel based on the estimated offset and the remaining offset.

18. The receiver device of claim 11, wherein the first offset estimator calculates correlations for the pilot symbols, detects a phase based on the calculated correlations; and divides the detected phase by a symbol interval or a frequency interval to estimate the one of the frequency offset and the timing offset based on the estimated offset.

19. The receiver device of claim 11, wherein the offset compensator compensates for the offset for the pilot symbols based on channel values with respect to the pilot symbols together with the estimated offset.

20. The receiver device of claim 11, wherein the offset compensator compensates for offset for the pilot symbols according to $$\hat{H}_{FO}^{u,r}[l_i^p,k_i^p]=\hat{H}_{LS}^{u,r}[l_i^p,k_i^p]e^{-jl_i^p\theta_{freq}^{r,u}} \text{ and}$$

$$\hat{H}_{TO}^{u,r}[l_i^p,k_i^p]=\hat{H}_{LS}^{u,r}[l_i^p,k_i^p]e^{-jk_i^p\theta_{timing}^{r,u}},$$

wherein $\hat{H}_{LS}^{n,r}[l_i^p,k_i^p]$ denotes a channel value with respect to a received signal in an i-th pilot tone of an r-th antenna of an LRU to which a terminal u is allotted, $\hat{H}$ denotes an estimation value of H obtained by estimation, $l^p$ denotes a symbol index of a pilot symbol p, $k^p$ denotes a frequency index of the pilot symbol p, $\theta_{freq}^{r,u}$ denotes the frequency offset, $\theta_{ti\,min\,g}^{r,u}$ denotes the timing offset, $\hat{H}_{FO}^{u,r}[l_i^p,k_i^p]$ denotes a channel estimation value compensating for the frequency offset, and $\hat{H}_{TO}^{u,r}[l_i^p,k_i^p]$ denotes a channel estimation value compensating for the timing offset.

21. A receiver device in a mobile communication system, the receiver device comprising:

a communication unit for receiving a signal;

a Fast Fourier Transform (FFT) unit for performing a FFT on the signal;

a pilot selector for selecting a plurality of pilot symbols from the transformed signal;

an estimation order determinator for determining whether to estimate a frequency offset on the pilot symbols first or to estimate a timing offset on the first, according to whether a minimum time distance between a pair of pilot symbols is less than a minimum frequency distance between the pair of pilot symbols;

a first frequency offset estimator for estimating a frequency offset of the pilot symbols when the estimation order determinator determines to perform frequency estimation first;

a frequency offset compensator for performing offset compensation on the pilot symbols based on the frequency offset determined by the first frequency offset determinator, when the estimation order determinator determines to perform frequency estimation first;

a first timing offset estimator for estimating a timing offset on the output of the frequency offset compensator;

a second timing offset estimator for estimating a timing offset of the pilot symbols when the estimation order determinator determines to perform timing estimation first;

a timing offset compensator for performing offset compensation on the pilot symbols based on the timing offset determined by the second timing offset estimator, when the estimation order determinator determines to perform timing estimation first; and a second frequency offset estimator for estimating a timing offset on the output of the timing offset compensator.

\* \* \* \* \*